(No Model.) 3 Sheets—Sheet 1.

F. B. MALLORY.
COMBINED SHUTTER WORKER AND FASTENER.

No. 374,608. Patented Dec. 13, 1887.

Witnesses:
Robt. L. Fenwick
Edward J. Fenwick

Inventor:
Frank B. Mallory
by his attys
Mason, Fenwick and Lawrence

N. PETERS, Photo-Lithographer, Washington, D. C.

(No Model.) 3 Sheets—Sheet 2.

F. B. MALLORY.
COMBINED SHUTTER WORKER AND FASTENER.

No. 374,608. Patented Dec. 13, 1887.

Witnesses:
Robt L Fenwick
Edward J Fenwick

Inventor:
Frank B. Mallory
by his attys
Mason, Fenwick and Lawrence (No Model.) 3 Sheets—Sheet 3.
F. B. MALLORY.
COMBINED SHUTTER WORKER AND FASTENER.
No. 374,608. Patented Dec. 13, 1887.
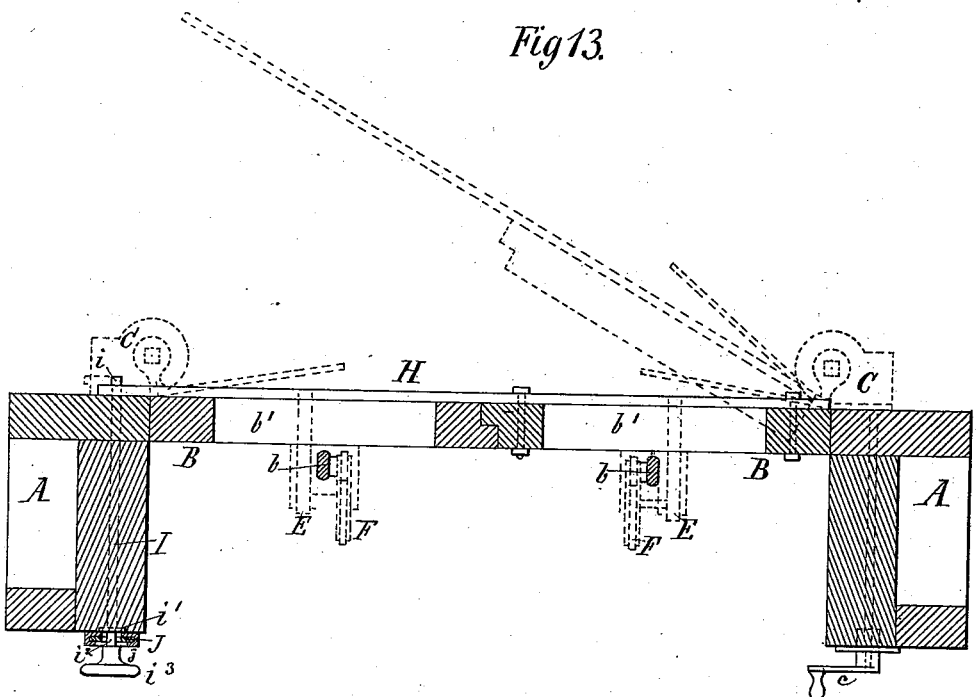
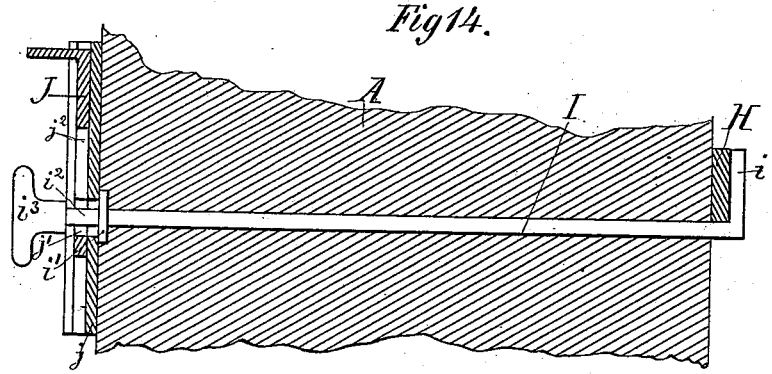
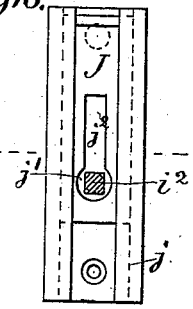
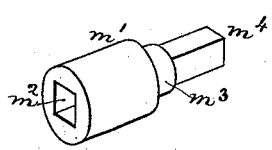
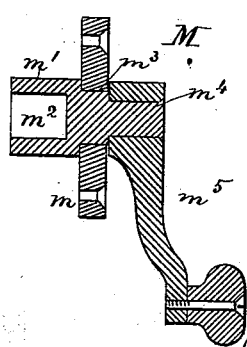
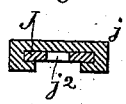
Witnesses:
Robt L. Fenwick
Edward J. Fenwick
Inventor:
Frank B. Mallory
by his attys
Mason, Fenwick and Lawrence

UNITED STATES PATENT OFFICE.

FRANK B. MALLORY, OF FLEMINGTON, NEW JERSEY.

COMBINED SHUTTER WORKER AND FASTENER.

SPECIFICATION forming part of Letters Patent No. 374,608, dated December 13, 1887.

Application filed July 27, 1887. Serial No. 245,421. (No model.)

*To all whom it may concern:*

Be it known that I, FRANK B. MALLORY, a citizen of the United States, residing at Flemington, in the county of Hunterdon and State of New Jersey, have invented certain new and useful Improvements in Shutter, Blind-Slat, and Bolt Operating Mechanism; and I do hereby declare the following to be a full, clear, and exact description of the invention, such as will enable others skilled in the art to which it appertains to make and use the same.

My invention relates to a shutter-worker which may first open the slats and then open the shutter, or which may unfasten a bolt and then open the shutter, or which may unfasten a bolt and simultaneously therewith open the slats and then open the shutter, said shutter-slat opener, bolt-operator, and shutter-worker being so constructed, arranged, and combined that by a reverse movement of the operating-shaft of the shutter-worker mechanism the shutter can be fully shut, the slats closed, and the bolt fastened.

The invention consists, mainly, in an improved operating-lever, in combination with a suitable shutter-worker mechanism and with mechanism connecting it with the slats or fastening-bolt, or with both the slats and said bolt, whereby either the slats of a shutter or the fastening-bolt, or both the slats of the shutter and the fastening-bolt, can be operated just preceding the act of opening the shutter by turning the shaft of the shutter-working mechanism and the shutter opened by a continuation of the movement of said shaft of the shutter-worker, the combination being such that the lever can close the slats and operate the bolt just after the shutter is fully closed; and it consists, secondarily, in certain other constructions, combinations, and arrangements of parts, as will be hereinafter described and specifically claimed.

Figure 1:
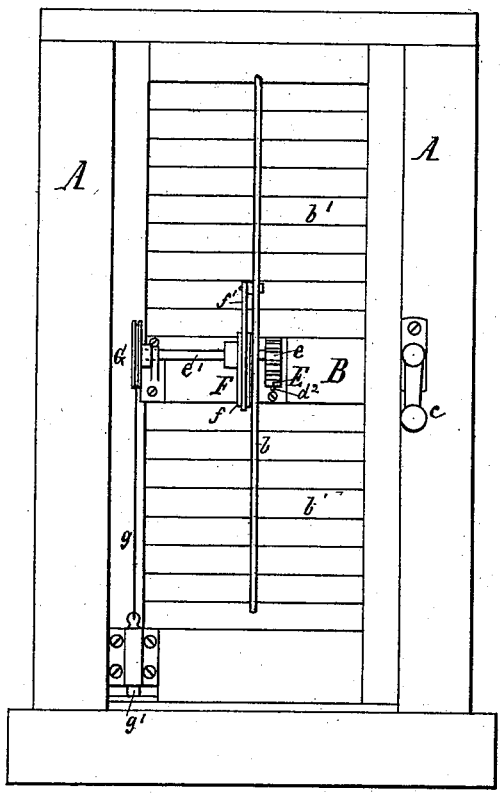
Figure 2:
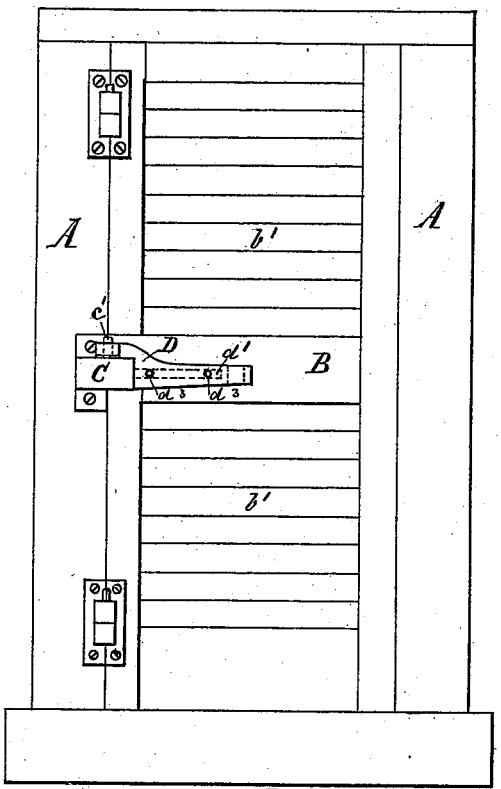
Figure 3:
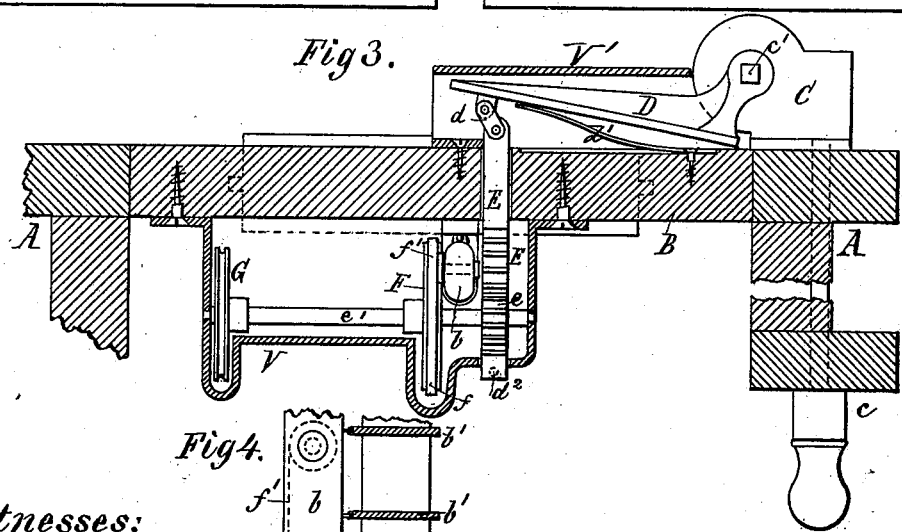
Figure 4:
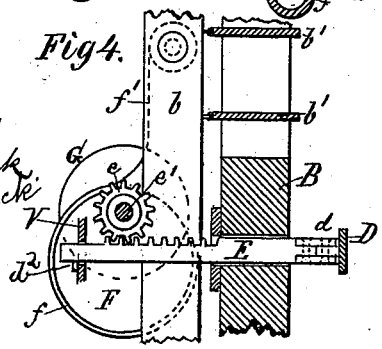
Figure 5:
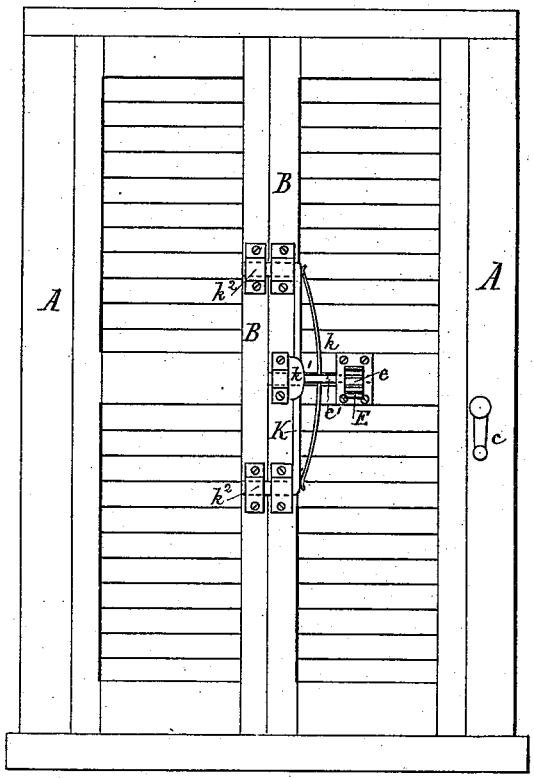
Figure 6:
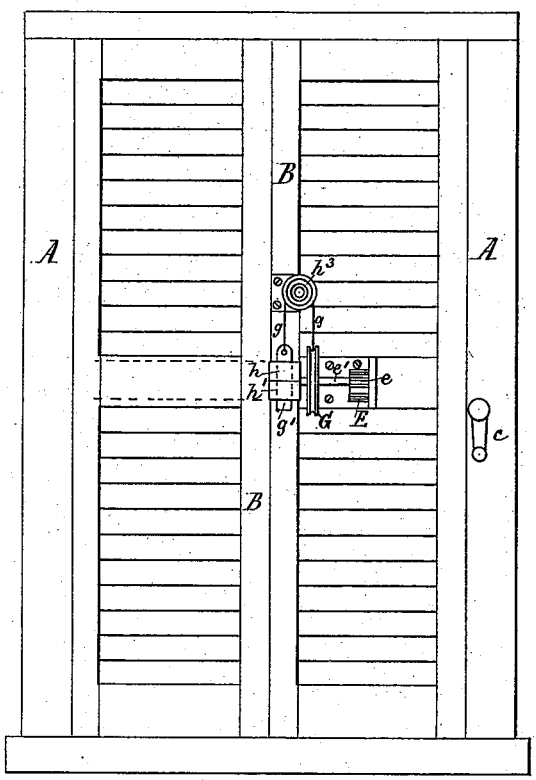
Figure 7:
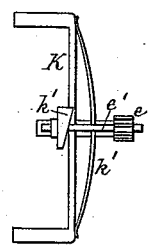
Figure 8:
Figure 11:
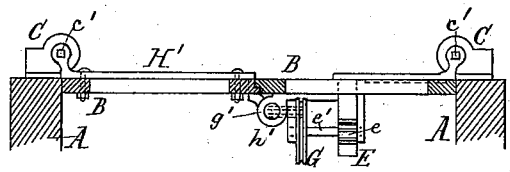
Figure 9:
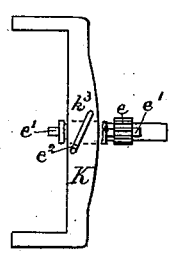
Figure 10:
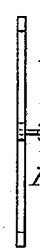
Figure 12:
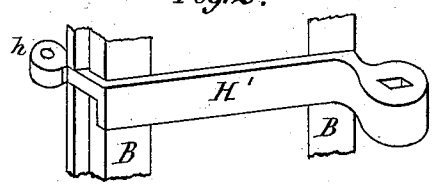

In the accompanying drawings, Figure 1 is a view showing a window frame and shutter with my invention, as seen from the inside of a building. Fig. 2 is a similar view, as seen from the outside of the building, the housing of the slat and bolt operating lever being omitted. Fig. 3 is a horizontal section of a window frame and shutter with my invention. In this view the slat and bolt operating mechanism are provided with housings, which are also shown in section, while the other parts are in elevation. Fig. 4 is an enlarged detail view of a portion of the slat-opening mechanism, the shutter-operating shaft of slat and bolt mechanism and the guide of the toothed rack being in section, while the other parts are in elevation. Figs. 5 and 6 are inside views of a pair of window-shutters provided with my slat-opener, shutter-worker, and bolt-operator, the bolt mechanism in these views being adapted for a pair of shutters. Figs. 7 and 8 are detail views of the parts shown in Fig. 5. Figs. 9 and 10 are views showing a slight change in the mechanism shown in Figs. 5, 7, and 8. Fig. 11 is a horizontal section of the shutters with my invention and the window-frame shown in Fig. 6. Fig. 12 is a perspective view of one of the hinging and bolting straps or irons shown in Fig. 6. Fig. 13 is a horizontal section of a window-frame and a pair of window-shutters with my slat-opener and shutter-worker, a fastening cross-bar and locking-bolt being substituted for the fastening-bolts shown in the other figures. Fig. 14 is an enlarged detail section showing the locking-bolt and its slide used with the bar shown in Fig. 13. Fig. 15 is a cross-section of the locking-bolt and face view of the fastening-slide. Fig. 16 is a horizontal section of Fig. 15. Fig. 17 is a perspective view of the socket end of the operating-shaft of the shutter-worker; and Fig. 18 is a section of the socket end, the escutcheon, and the crank-arm of the shutter-operating shaft.

The letter A in the drawings represents a window-frame; B, a window-shutter; C, a shutter-worker, and *c* the crank-handle of the latter. The ordinary square shank, *c'*, of the shutter-worker C is provided with an arm, D, which, by means of a link-joint, *d*, operates a rack, E, transversely through the shutter B, and is held away from the shutter by the tension of a spring, *d'*, suitably fastened to the shutter. A stop-pin, $d^2$, is provided on the rack, which, by striking against a housing, V, covering said rack and other parts connected with it, limits the distance of the arm D from the shutter and establishes the stroke of the rack. A pinion, *e*, on a shaft, *e'*, suitably hung to the housing V or the shutter B, is operated by the rack. This shaft $e'$ is provided with an eccentric, F, and a chain-pulley, G, the eccentric having a strap-arm, $f$, which is connected at $f'$ with the slat-connecting rod $b$ of the shutter, while the chain-pulley is connected, by means of a chain or cord, $g$, with a drop-bolt, $g'$, as illustrated in Fig. 1. By this construction the slats $b'$ of the shutter are opened and the bolt $g'$ pulled up or unfastened when the arm D is moved from the shutter, and the slats are closed and the bolt fastened by a reverse movement of the shutter-worker shaft. After opening the shutter-slats and unlocking the said bolt, as just described, the revolution of the crank-handle $c$ being continued, the shutter will be swung open by reason of the stop-pin $d^2$ checking the action of the spring $d'$ and pulling the shutter along. While the shutter remains open the arm D stands away from the shutter, as seen in Fig. 3, and while the shutter is being swung inward in order to close it the said position of the arm D is maintained until the shutter has arrived in the window-frame, as fully shown in Fig. 3. The shutter now being stationary does not yield to the spring $d'$, and by continuing to turn the crank-handle the arm D is forced against the spring $d'$ and shutter B until it touches the latter. During this operation the rack E is pushed in, the slats $b'$ are closed by the descending strap-arm $f$ of the eccentric F, and the bolt $g'$ is dropped in front of its keeper, thus locking the shutter and closing the slats. I shall in some constructions, when the shutters are made solid or without slats or with fixed slats, omit the slat-operating device and use only the bolt-operating device in connection with the shutter-worker. Again, I may make use of the shutter-worker in connection with the slat-operating device, and omit the bolt and its operating device in cases where a lock-bar is used, as shown in Fig. 13. In this instance one of the shutters B is provided with a transverse bar, H, securely fastened to it by bolts or otherwise, which bar extends over the mate shutter and to the window-frame, where it is held by a revolving keeper-arm, $i$, at the end of a shaft, I. This shaft I is fitted into the frame A and held there by means of a collar, $i'$. Beyond the collar $i'$ the shaft is square, as at $i^2$, and beyond that it is provided with a suitable handle, $i^3$, whereby it is turned. The square portion $i^2$ is passed through a slotted flat check-slide, J, sliding in a guide-plate, $j$, secured to the window-frame. When the shaft I is being turned, the square portion $i^2$ revolves freely in the lower widened portion, $j'$, of an otherwise parallel slot, $j^2$, of the bolt J; but when the shaft I is to remain stationary the check-slide J is moved down until the slot $j^2$ has closed upon the portion $i^2$ on both sides, thereby keeping it from turning. Thus the shaft I can be rigidly held, either when locking the bar H or when not so employed.

The bolt-operating mechanism above described may be modified in many and various ways, some of which I have shown in Figs. 5 to 12. The modification shown in Figs. 5, 7, 8 represents two bolts coupled by a bar, K, and locked by a spring, $k$, while a cam, $k'$, on the shaft $e'$ pushes the coupling-bar K back against the spring and moves the bolts out of their keepers $k^2$ on the opposite shutter. In Figs. 9 and 10 the coupling-bar K is provided with an inclined slot, $k^3$, in which a pin, $e^2$, on the shaft $e'$ moves, and thus operates the bolts without the aid of a spring. In Figs. 11 and 12 one of the shutters is provided with an outer hinging and bolting strap, H', which at the center point of the shutters is turned inward, and is there provided with a bolt-eye, $h$, another bolt-eye, $h'$, being, by means of a flange, $h^2$, and ordinary screws, fastened to the opposite shutter.

A bolt, $g'$, suspended on a cord, $g$, is dropped, by the operation of the pulley G, into the eyes $h\ h'$ of the two closed shutters in a way similar to that shown in Figs. 1 and 3, save that here an auxiliary pulley, $h^3$, makes the cord effective for its purpose. In order to facilitate the construction of the operating crank-handle M and connect it permanently and in a cheap manner with the retaining or escutcheon plate $m$, I use a socket-connection, $m'$, with a square socket-hole, $m^2$, a round journal-bearing, $m^3$, and a square shank, $m^4$, in connection with a crank-handle, $m^5$, having a square hole, which fits the shank $m^4$.

The journal-bearing $m^3$ is inserted into the escutcheon-plate, the crank-handle slipped over the shank $m^4$, and the latter riveted to the crank-handle. Thus the escutcheon-plate and crank-handle may be made of more costly and showy metal (such as brass) than the socket-connection $m'$, and at the same time a device is produced which may be at once fitted to or slipped upon the end portion of the square crank-rod of the shutter-worker and thus fastened to the window-frame without extra fittings. I have shown marks $d^3$ on the arm D, in imitation of screw-heads, which are intended as false indications to burglars who will spend their time in trying to unscrew the fastening of the arm D from the shutter, while in fact no such fastening exists. A housing, V', may be placed over the arm D to make it burglar-proof.

It might be practical to dispense with the link between the slat and bolt operating lever and rack-bar by making a loose connection between said parts, such as a transverse slot in one part and a pin of the other part moving in said slot; but I prefer to use the link, as shown.

By my invention the slats of the closed shutters can be opened in the room of a building without opening the windows, and observations of the street may be taken without admitting cold air, rain, or snow into the room.

What I claim as my invention, and desire to secure by Letters Patent of the United States, is—

1. The combination, with the fastening-bolt, of the arm D, spring $d'$, gearing for moving the shutters, rack E, pinion $e$, shaft $e'$, and the connections between the fastening-bolt and said shaft $e'$, substantially as and for the purpose described.

2. The combination, with the slats and fastening-bolt of shutters, of the mechanism consisting of the arm D, eccentric F, strap-arm $f$, slat-connecting rod $b$, shaft $e'$, connections between the bolt and shaft, pinion $e$, and rack E, substantially as and for the purpose described.

3. In combination with the shutter-operating arm D, the spring $d'$, substantially as and for the purpose described.

4. The combination of the arm D, spring $d'$, gearing for moving the shutters, rack E, pinion $e$, shaft $e'$, and the connections between the slats and said shaft $e'$, substantially as and for the purpose described.

5. The combination of the arm D, rack F, spring $d'$, and stop-pin $d^2$, substantially as and for the purpose described.

6. The slat mechanism operated by the arm D, and consisting of eccentric F, strap-arm $f$, slat-connecting rod $b$, shaft $e'$, pinion $e$, and rack E, substantially as and for the purpose described.

In testimony whereof I affix my signature in presence of two witnesses.

FRANK B. MALLORY.

Witnesses:
C. C. DUNHAM,
J. J. VAN LIEU.